(No Model.)
C. H. CARR.
BICYCLE.
No. 518,777. Patented Apr. 24, 1894.
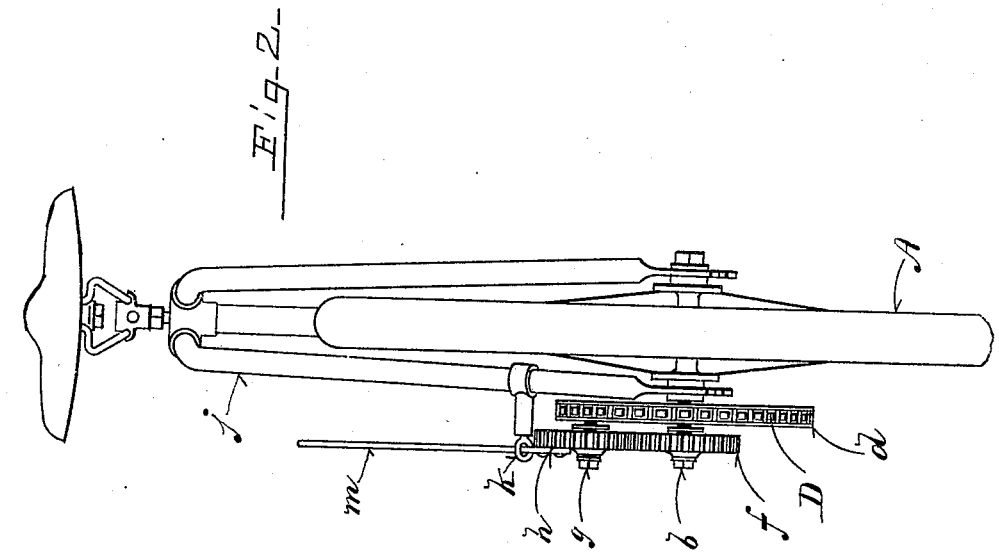
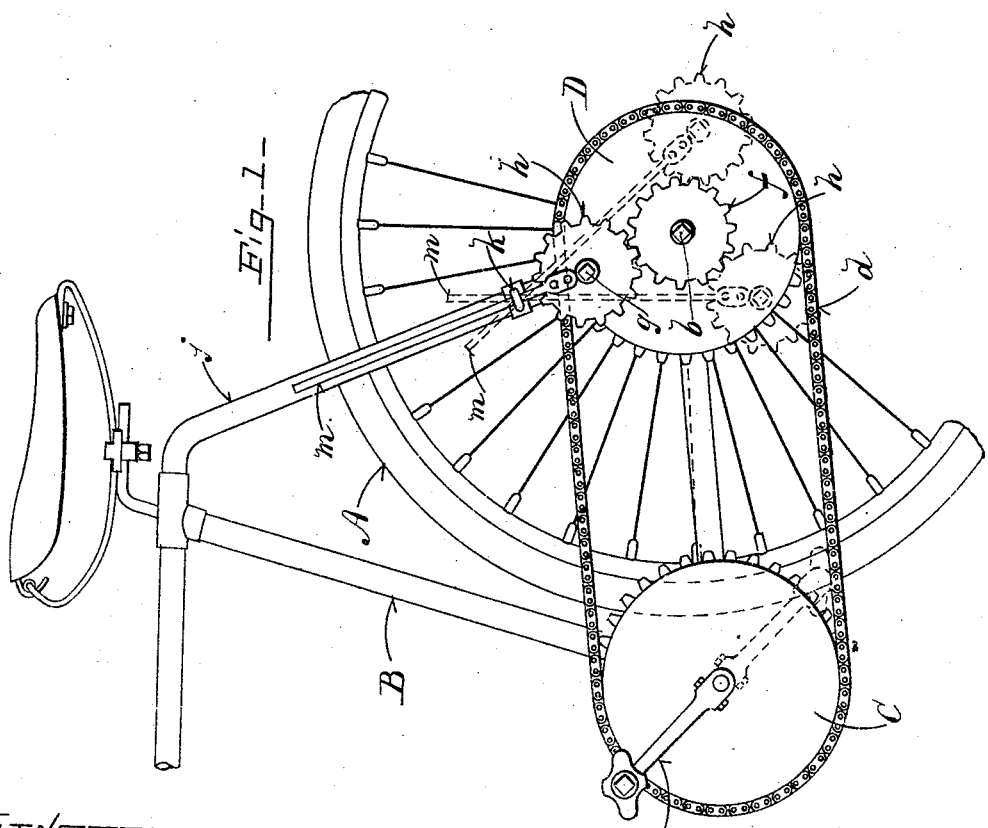

UNITED STATES PATENT OFFICE.

CHARLES HOWARD CARR, OF LYNN, MASSACHUSETTS.

BICYCLE.

SPECIFICATION forming part of Letters Patent No. 518,777, dated April 24, 1894.

Application filed January 6, 1894. Serial No. 495,890. (No model.)

*To all whom it may concern:*

Be it known that I, CHARLES HOWARD CARR, of Lynn, in the county of Essex, State of Massachusetts, have invented certain new and useful Improvements in Bicycles, of which the following is a description sufficiently full, clear, and exact to enable any person skilled in the art or science to which said invention appertains to make and use the same, reference being had to the accompanying drawings, forming part of this specification, in which—

Figure 1 is a side elevation of my improved bicycle; and Fig. 2 an end elevation of the same.

Like letters of reference indicate corresponding parts in both figures of the drawings.

A represents the drive-wheel of the bicycle and B the frame, these parts being of the ordinary form and construction. The main sprocket, C, is journaled in the usual manner on the frame and the drive-sprocket, D, is loose on the axle, b, of the drive-wheel, and is of the same diameter as the sprocket, C. Ordinarily, this drive-sprocket is in the ratio of one to two. A chain, d, connects the two sprockets. A gear, f, is fast on the axle, b, outside the sprocket, D. Near the periphery of the sprocket, D, a stub-shaft, g, is mounted and on said shaft a gear, h, is journaled of the same diameter as the gear, f, and meshing therewith. On the rear fork, j, of the frame, B, there is a loop or eye, k. A rod, m, is fast to the hub of the gear, h, and is fitted to play loosely and vertically through the eye, k, serving to maintain the gear, h, in the same relative position as the sprocket, D, rotates as hereinafter described.

In the use of my improvement, power being applied to the cranks, p, in the usual manner and the sprocket, D, loose on the axle, b, being rotated the stub-shaft carrying the gear, h, causes the fast gear, f, to rotate said gear, h, passing entirely around the periphery of the gear, f, and maintaining by means of the guide-bar, m, the same relative position said guide-bar passing outside the end of the shaft, b, as shown by dotted lines in Fig. 1. The speed applied to the gear, f, is multiplied in a manner which will be readily understood by all conversant with such matters without a more explicit description.

Having thus explained my invention, what I claim is—

In a bicycle, the frame and drive-wheel in combination with a sprocket journaled on said frame, a sprocket of like diameter loose on the axle of the drive-wheel; a chain connecting said sprockets; a gear fast on said axle; a stub-shaft adjacent the periphery of said loose sprocket; a gear of like diameter with the axle gear journaled on said stub-shaft and meshing with said axle-gear; a guide-rod fast to said sprocket-gear and restrained by a connection with the frame.

CHARLES HOWARD CARR.

Witnesses:
K. DURFEE,
O. M. SHAW.